US012682265B2

(12) United States Patent
Singh et al.

(10) Patent No.: US 12,682,265 B2
(45) Date of Patent: Jul. 14, 2026

(54) METHOD FOR IMPROVING QUANTUM REPEATER RATE

(71) Applicant: The University of Chicago, Chicago, IL (US)

(72) Inventors: Manish Singh, Chicago, IL (US); Supratik Guha, Chicago, IL (US)

(73) Assignee: The University of Chicago, Chicago, IL (US)

( * ) Notice: Subject to any disclaimer, the term of this patent is extended or adjusted under 35 U.S.C. 154(b) by 757 days.

(21) Appl. No.: 18/040,080

(22) PCT Filed: Aug. 17, 2021

(86) PCT No.: PCT/US2021/046252
§ 371 (c)(1),
(2) Date: Jan. 31, 2023

(87) PCT Pub. No.: WO2022/040151
PCT Pub. Date: Feb. 24, 2022

(65) Prior Publication Data
US 2023/0401471 A1     Dec. 14, 2023

Related U.S. Application Data

(60) Provisional application No. 63/068,153, filed on Aug. 20, 2020.

(51) Int. Cl.
*G06N 10/20*     (2022.01)
*H04B 10/70*     (2013.01)

(52) U.S. Cl.
CPC ............. *G06N 10/20* (2022.01); *H04B 10/70* (2013.01)

(58) Field of Classification Search
CPC ................................ H04B 10/70; G06N 10/20
(Continued)

(56) References Cited

U.S. PATENT DOCUMENTS 8,103,172 B2 *   1/2012   Peters ................... H04L 9/0855
                                                          398/175
11,621,785 B2 *  4/2023   Kaliteevskiy .......... H04B 10/70
                                                          398/173
(Continued)

FOREIGN PATENT DOCUMENTS

GB          2470069 A  * 11/2010   .......... H04L 9/0852
GB          2471470 A  *  1/2011   .............. H04L 9/12
(Continued)

OTHER PUBLICATIONS

Briegel, H.-J. et al.; "Quantum Repeaters: The Role of Imperfect Local Operations in Quantum Communication"; The American Physical Society; Physical Review Letters, vol. 81, No. 26; Dec. 28, 1998; 4 pages.
(Continued)

*Primary Examiner* — Amritbir K Sandhu
(74) *Attorney, Agent, or Firm* — Crowell & Moring LLP

(57) ABSTRACT

This disclosure is directed to a methods and systems for establishing a long-range quantum link in a quantum communication network and for improving connection rate of the quantum link. The quantum link is established across multiple quantum repeaters relying on quantum entanglement swap operations in the multiple quantum repeaters.
(Continued)

602 ~
604 ~

The methods and systems use nested connection loops that are started as soon as quantum repeater resources become available. As such, another connection loop having a head start can be used to continue achieving the quantum link when one connection loop fails, thereby improving the connection rate for the quantum link.

18 Claims, 13 Drawing Sheets

(58) Field of Classification Search
USPC ........................................................... 398/40
See application file for complete search history.

(56) References Cited

U.S. PATENT DOCUMENTS

| | | | |
|---|---|---|---|
| 2004/0264958 A1 | 12/2004 | Zoller et al. | |
| 2012/0050834 A1* | 3/2012 | Harrison | H04B 10/70 |
| | | | 359/107 |
| 2017/0163415 A1 | 6/2017 | Gray et al. | |

FOREIGN PATENT DOCUMENTS

| | | | | |
|---|---|---|---|---|
| WO | WO-2016204847 A2 * | 12/2016 | ............ | H04J 14/052 |
| WO | WO-2022040151 A1 * | 2/2022 | ........... | H04L 9/0855 |

OTHER PUBLICATIONS

Hensen, B. et al.; "Loophole-free Bell inequality violation using electron spins separated by 1.3 kilometres"; Nature, vol. 526; Oct. 29, 2015; pp. 682-686.

Muralidharan, S. et al.; "Optimal architectures for long distance quantum communication"; Scientific Reports; Feb. 15, 2016; 10 pages.

Sangouard, N. et al.; "Quantum repeaters based on atomic ensembles and linear optics"; Review of Modern Physics, vol. 83, No. 1; Jan.-Mar. 2011; 48 pages.

Pant et al.; "Routing entanglement in the quantum internet"; npj, Quantum Information; retrieved from the Internet on Jan. 23, 2023 at https://www.nature.com/articles/s41534-019-0139-x; Mar. 13, 2019; 9 pages.

International Search Report and Written Opinion mailed Nov. 30, 2021 for International Application No. PCT/US2021/046252.

* cited by examiner

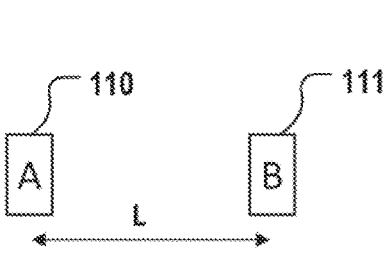
Figure 1a
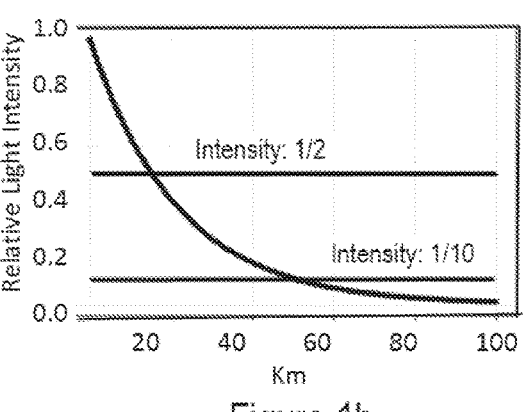
Figure 1b
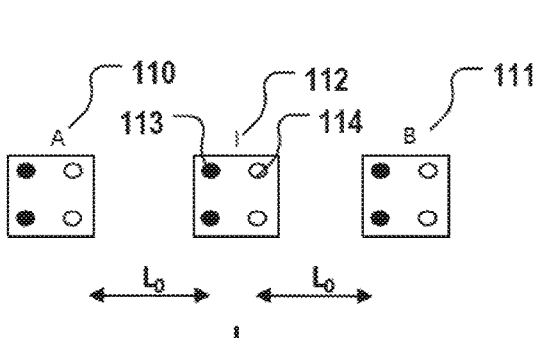
Figure 1c
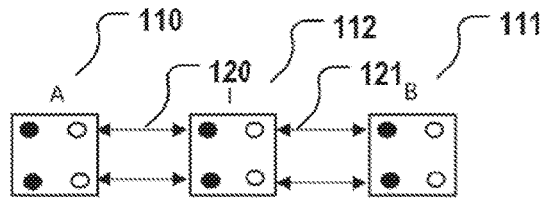
Figure 1d
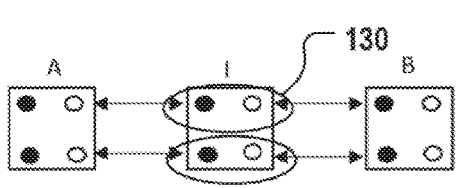
Figure 1e
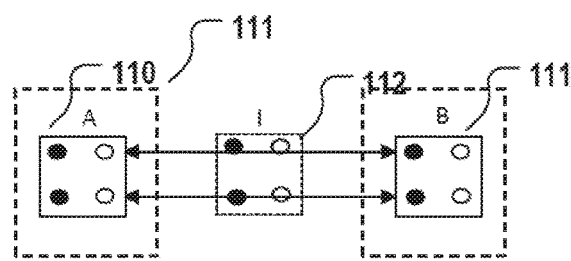
Figure 1f
Figure 1

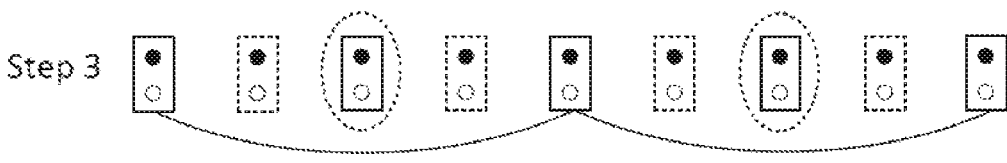
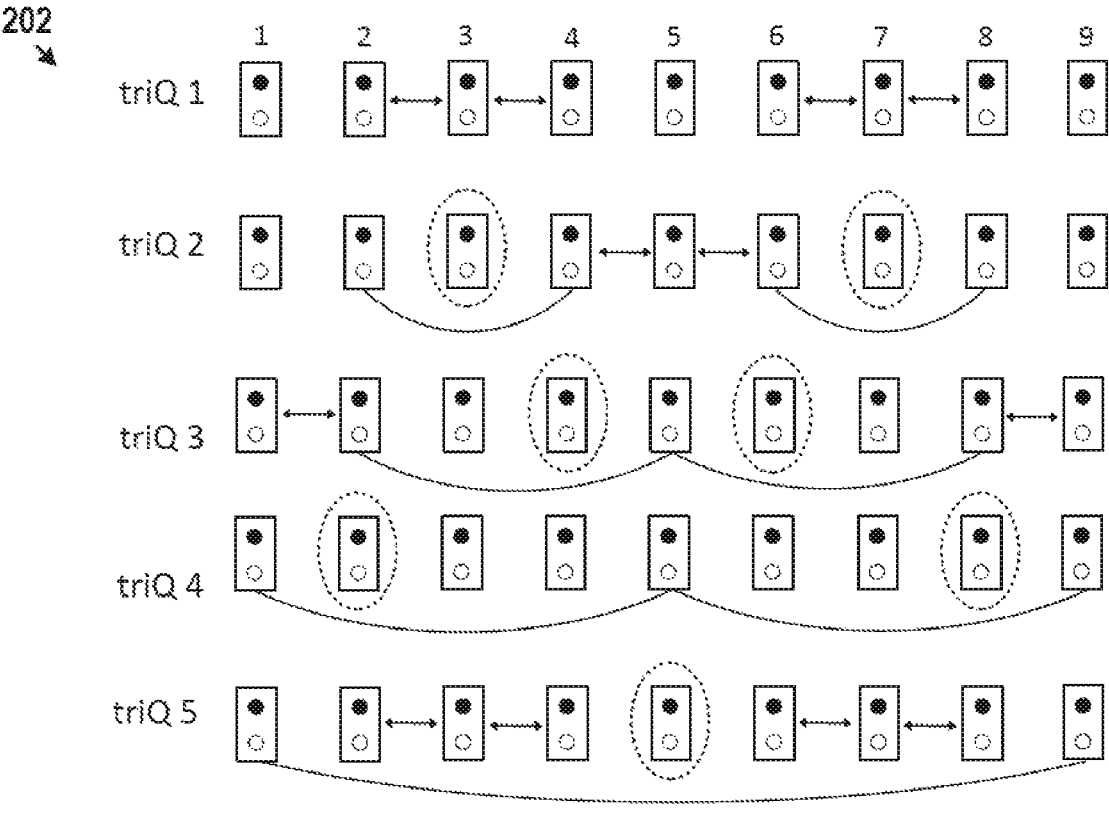
Figure 2a
Figure 2b

METHOD FOR IMPROVING QUANTUM REPEATER RATE

CROSS REFERENCE

This application is a national phase application of the PCT Application No. PCT/US2021/046252, filed on Aug. 17, 2021, which is based on and claims priority to U.S. Provisional Application No. 63/068,153 filed on Aug. 20, 2020. These prior patent applications are herein incorporated by reference in their entireties.

GOVERNMENT LICENSE RIGHTS

This invention was made with government support under DE-AC02-05CH11231, awarded by United States Department of Energy and grant number 5-28336 awarded by the Department Defense. The government has certain rights in the invention.

BACKGROUND

A network for communicating quantum information, or quantum network, relies on quantum links between network nodes at different locations. Quantum links may be established by entangling quantum bits (qubits) between the network nodes. The qubits may be entangled via transmitting entangled photons between the network nodes. The spatial span of a direct quantum link via entangled photons between network nodes may be limited as a result of transmission loss in, e.g., an optical fiber. As such, quantum communication between network nodes separated by a large distance may need to rely on indirect quantum links established via intermediate repeater nodes. Such an indirect quantum link requires a sequence of quantum operations in the repeater nodes. When any of the probabilistic operations is unsuccessful, the entire sequence needs to start over until the indirect quantum link is established.

BRIEF DESCRIPTION OF THE DRAWINGS

The system and method may be better understood with reference to the following drawings and description. Non-limiting and non-exhaustive embodiments are described with reference to these drawings. The components in the drawings are not necessarily to scale, with emphasis instead being placed upon illustrating the general underlying principles of the various disclosed embodiments.

FIGS. 1a-1f illustrate principles of quantum entanglement swap and purification operations in quantum repeaters.

FIGS. 2a-2b illustrate example sequences of quantum operations for establishing an end-to-end quantum link between two remote network nodes via seven quantum repeater nodes using nested levels of quantum entanglement swap operations.

FIG. 5 illustrates another example sequence of quantum operations with a series of multiple nested connection loops for establishing an end-to-end quantum link between two end network nodes via seven quantum repeater nodes using nested levels of quantum entanglement swap operations.

DETAILED DESCRIPTION

Figure 3:
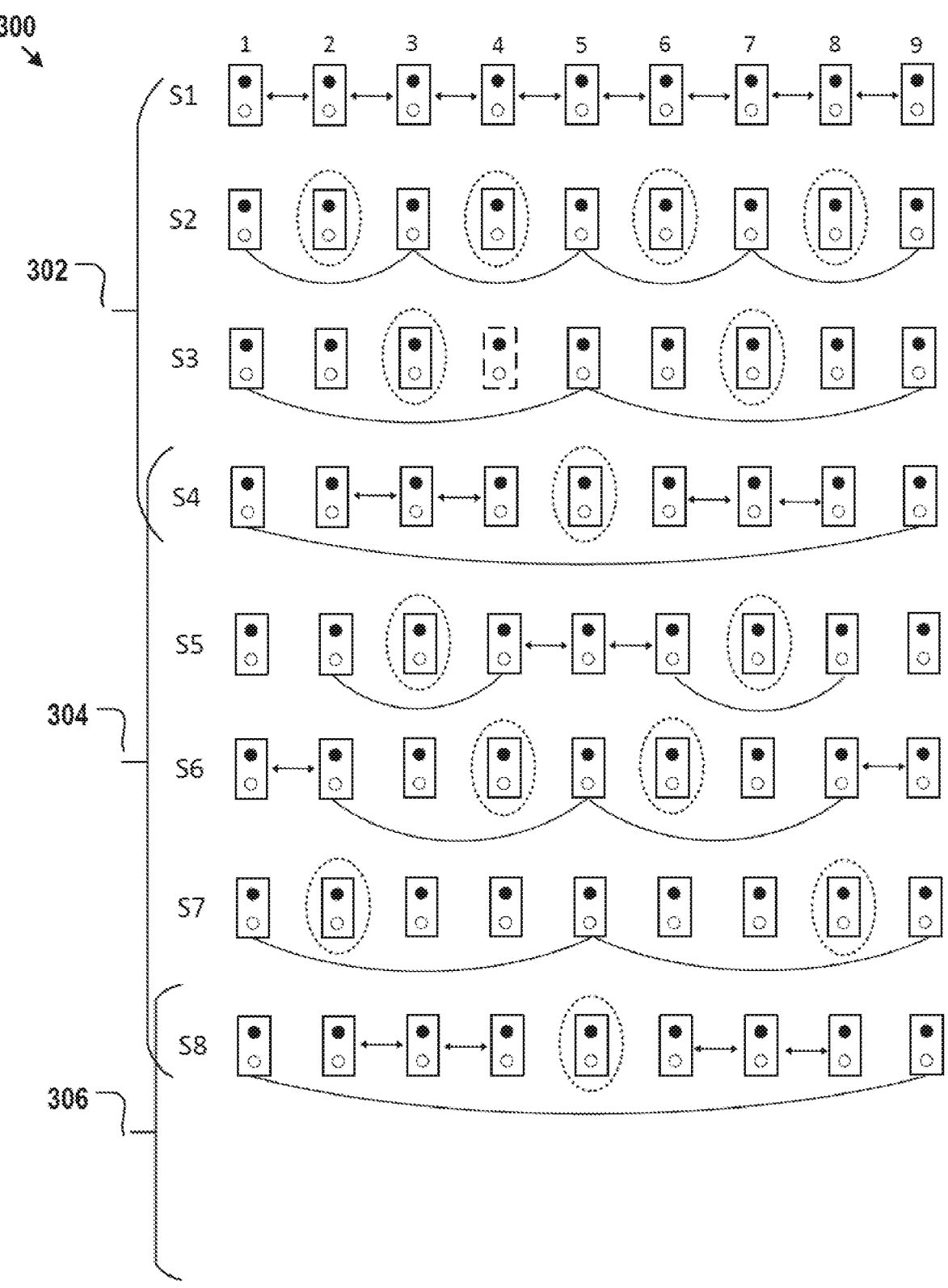
FIG. 3 illustrates an example sequence of quantum operations with nested connection loops for establishing an end-to-end quantum link between two end network nodes via seven quantum repeater nodes using nested levels of quantum entanglement swap operations.

A quantum communication network provides a system for secure exchange of information (quantum information or non-quantum, or classical information). The term quantum communication may broadly refer to a transfer of information through shared entanglement pair between two end devices or network nodes. As one example, this entanglement sharing can be achieved by sending entangled photons. While transmission distance of these entangled photons in a transmission medium, e.g., an optical fiber, is limited by a transmission loss, quantum repeaters may be deployed to extend the reach of the quantum entanglement. In particular, these quantum repeaters may act as network nodes connecting short communication spans or segments. The entanglement pairs may be created over short distances between the repeater nodes. These repeater nodes may then perform a local entanglement swap to extend the entanglement between nodes across a common node until the end nodes are connected. As there is no direct long-distance transmission of entangled photons required between the end nodes, the issue caused by transmission loss may be minimized.

However, as the numbers of quantum repeater nodes and entanglement swaps rise with increasing distance between the end nodes, the task of establishing an end-to-end quantum link becomes more problematic. In particular, quantum entanglement is sensitive to the environment, and the purity and quality of the entanglement drops with each operation that is performed during the connection process. This may necessitate the use of more complex techniques for entanglement purification that utilizes a plurality of lower purity entanglements to increase the purity to a higher level. Additionally, because the connection process using quantum repeaters and entanglement swaps involves a sequence of intermediate quantum connections, failure of any of these intermediate connections may require a restart of the connection sequence, leading to very high sensitivity of the time needed to establish the end-to-end connection to the environmental factors and low connection rates over a long distance and a large number of quantum repeaters. A longer connection time, in turn, places a higher demand on quantum memories used for storing quantum information, the processing of which depends on the establishment of a quantum link between quantum network nodes. In particular, the quantum memory may need to maintain coherence in the quantum information stored therein longer than the connection time.

In this disclosure, various embodiments of a quantum connection method are disclosed for increasing the rate of quantum communication between quantum nodes via a plurality of quantum repeaters. The disclosed embodiments operate to increase the rate for quantum communication channels with communication length involving 9 or more network nodes (including both two end nodes and other intermediate nodes acting as quantum repeaters). The method leads to a significant gain in communication rate for connections involving a larger number of network nodes with higher nesting levels. The increase of communication rate is achieved via one or more nested levels of connection loops that are sequentially initiated when neighboring quantum repeaters are freed up from their roles in preceding connection loops. As such, in the case that a current connection loop fails, one or more inner loops for establishing the quantum connection would have already progressed forward, providing a head start and a gain in connection speed over having to restart the connection procedure afresh.

Quantum Nodes and Quantum Entanglement Swap

FIGS. 1a-1f shows basis steps for establishing a quantum link via a quantum repeater. In FIGS. 1a-1f, a rectangle box such as 110, 111, or 112 is used to denote a quantum node. "A" and "B" represent two end quantum nodes whereas "I" represents an intermediate quantum repeater. The quantum repeater may herein be alternatively referred to as a quantum repeater node. Each of the quantum nodes includes one or more pairs of quantum bits (qubits), denoted by pairs of closed circles and open circles such as 113 and 114 pair of FIG. 1. The closed and open circles of a qubit pair are referred to as a first and a second qubit of the qubit pair, respectively. The solid arrows, such as 120 and 121, represent quantum entanglement between the qubits pointed to by the two ends of the arrows.

FIG. 1a shows the two end quantum nodes 110 and 111 ("A" and "B") separated by a distance L. In the implementations where a quantum link between quantum nodes 110 and 111 is to be established by a transmission of one or more entangled photons, the optical attenuation from an optical fiber connecting the two end nodes causes loss of quantum information. FIG. 1(b) shows an example optical intensity attenuation in an optical fiber as a function of the transmission length for typical wavelength of photons used for quantum information communication. As shown in FIG. 1b, the optical intensity attenuates greatly within a span of tens of kilometers. In particular, FIG. 1b shows that at 50 km there in only a 1 in 10 chance of a photon from node 110 reaching node 111. As such, direct quantum link between quantum nodes 110 and 111 may be difficult to achieve beyond such a communication span, and analogous to a repeater in classical communication, a quantum repeater node 112 may be used to assist in the establishment of a quantum link between nodes 110 and 111, as shown by the quantum repeater node 112 in FIG. 1c. In FIG. 1c, the channel length L is divided by the quantum repeater node 112 into two communication segments each of length $L_0$ (in some implementations, the two segments may be of different length). FIG. 1c further shows the end quantum nodes 110 and 111 and the repeater node 112 each having pairs of qubits in their original un-entangled states. FIG. 1d shows an initialization of these quantum nodes by entangling the second qubits of the qubit pairs in the quantum node 110 and 112 with the first qubits of the qubit pairs in the quantum repeater node 112, and 111, as shown by arrows 120 and 121 in FIG. 1d, respectively. The initialization process described in FIG. 1d essentially establishes a chain of initial short-span inter-repeater quantum links.

FIG. 1e shows performing a quantum entanglement swap between the first qubits and the second qubits in the quantum repeater 112 in a next step, as indicated by the solid elliptical boxes such as 130. As indicated by the arrows 140 in FIG. 1f, the second qubits of the end quantum node 110 are then entangled with the first qubits of the end quantum node 111 after the quantum entanglement swap of FIG. 1e. As such, a quantum connection would be established across the quantum repeater 112 after the entanglement swap, and the quantum repeater 112 becomes idle (as shown as being dotted in FIG. 1f).

The process described in FIGS. 1c-1f provides the basic manner in which quantum entanglement is extended to longer distances via a quantum repeater node. Each quantum entanglement swap in a quantum repeater node may take some time to complete and the time needed for each of such quantum entanglement swap may be denoted as $t_{swap}$.

FIGS. 1a-1f only show establishing quantum link between two end quantum nodes using a single quantum repeater and two inter-node communication segments. The underlying principles can be extended to quantum communication channels having multiple communication segments needing multiple quantum repeaters.

While FIGS. 1c-1f include multiple qubit pairs in each quantum repeater node for independently establishing multiple long distance or long-range quantum connections, a subset of these qubits in the quantum repeaters may be grouped together and used for extending one quantum connection via a quantum entanglement purification process. Specifically, one or more of the first qubits of a quantum node may be grouped together for achieving entanglement purification which involves a use of multiple qubits of lower quantum entanglement fidelity to create a quantum entanglement with higher fidelity. In the various implementations below, each quantum node is viewed as including a single pair of qubits. The underlying principles described below, however, apply to quantum nodes having multiple pairs of qubits acting as a single logic qubit pair via a separate entanglement purification procedure.

In some implementations, the end quantum nodes 110 and 111, if not in communication with other quantum nodes beyond the quantum repeater nodes therebetween, may only need to include single qubits (or single logic qubits) rather than qubit pairs.

A physical implementation of a repeater may involve one or more pairs of quantum memory qubits, excitation sources that can interact with the memory qubit, and supporting instrumentation that allows the user to control and manipulated the quantum state of the memory qubits and includes the capability to perform operations on two qubits together (multi-qubit operation). More details are described below in relation to FIG. 13.

In practical implementations, N+1 quantum nodes including two end nodes (alternatively referred to as terminal nodes) and N−1 intermediate quantum repeater nodes may be configured to form a series of successive direct N communication links between neighboring quantum nodes, corresponding to N communication segments. Once quantum link (or quantum entanglement) between some or all neighboring quantum nodes are created, a longer-range quantum link between any two nodes among the N+1 quantum nodes that are separated by two communication segments may be established via quantum entanglement swaps, as described in FIGS. 1c-1f. Quantum entanglement swaps may be further nested in multiple levels to achieve quantum link between quantum nodes of even longer range. As shown in the examples below, a quantum link may eventually be established between the two end quantum nodes after a plurality of nesting levels of quantum entanglement swaps in the N−1 intermediate quantum repeater nodes.

Standard Algorithm for Establishing Quantum Link via Quantum Repeaters

FIG. 2a illustrates an example sequence 200 of quantum operations for establishing an end-to-end quantum link between two remote network nodes labeled as nodes 1 and 9 via seven quantum repeater nodes labeled as nodes 2-8 using quantum entanglement swap as described in FIGS. 1c-1f. The example sequence 200 is herein referred to as a "standard algorithm". The two end nodes 1 and 9, may be alternatively referred as node A and node B, respectively, as indicated in FIG. 2a. The nodes 1-9 are arranged in series with N=8 direct communication segments between each pair of neighboring nodes. The sequence 200 may include 4 steps with 3 nesting levels of quantum entanglement swap operations.

In Step 1, a series of eight consecutive direct single-segment quantum links may be first established between neighboring quantum nodes of the series of nodes 1-9, as indicated by the solid arrows in Step 1 of FIG. 2a similar to Step 1d of FIG. 1 above. For simplicity, one pair of a first and a second qubits are included in each of the quantum nodes 1-9 (two or more pairs in each of the quantum repeaters may be included, if quantum entanglement purification is needed). In some particular implementations, each of the direct single-segment quantum link may be established by entangling a second qubit of one quantum node with a first qubit of a next quantum node, using, for example, entangled photon pairs transmitted via the optical fiber connecting the neighboring quantum nodes.

In Step 2 of FIG. 2a, four first level of quantum entanglement swap operations between the first qubit and the second qubit in alternate quantum repeater nodes, e.g., quantum repeater nodes 2, 4, 6, and 8 may be performed, as shown by the dotted ovals illustrated in Step 2. Following such quantum entanglement swaps, quantum links each across two communication segments may be established, as shown by the solid linking lines in Step 2 of FIG. 2a. As further shown in Step 3, the nodes that have just performed the first level of quantum entanglement swap operations, e.g., quantum nodes 2, 4, 6, and 8, become uninvolved, decommissioned, or idle from further steps in the quantum linking process 200.

Further in Step 3, two second level of quantum entanglement swap operations are performed in alternate quantum repeater nodes (e.g., quantum nodes 3 and 7) among the remaining linked quantum nodes (e.g., quantum nodes 1, 3, 5, 7, 9), as shown by the dotted ovals in Step 3 of FIG. 2a. Following the second level quantum entanglement swap operations in Step 3 of FIG. 2a, quantum links spanning four communication segments are formed, as shown by the solid lines in Step 4. As shown in Step 4, end node 1 and end node 9 are now linked only through quantum node 5, with the series of quantum repeater nodes 2, 3, and 4 and the series of quantum repeater nodes 6, 7, and 8 all uninvolved, decommissioned, or idle in further establishment of a quantum link between the end quantum node 1 and end quantum node 9.

Further in Step 4, a third final level of quantum entanglement swap operation may be performed in the only remaining intermediate quantum repeater node (e.g., quantum repeater node 5), thereby establishing a direct quantum link between end quantum node 1 and end quantum node 9 spanning 8 communication segments, as shown by the solid line in Step 4 of FIG. 2a. After Step 4, the end-to-end long-range quantum link is established and used up in the communication. The quantum link may then need to be reestablished and the link sequence above and as shown in FIG. 2a repeats.

In the example of FIG. 2a above, a total of $\log_2(9-1)+1=4$ steps are used with $\log_2(9-1)=3$ rounds of quantum entanglement swaps for $2^3+1=9$ quantum nodes including two end quantum nodes and $2^3-1=7$ intermediate quantum repeater nodes connectable by $2^3=8$ communication segments. In a practical quantum communication system, the length of a single communication span may be denoted by $L_0$, as determined by factors such as fiber loss. A total number of communication segments needed for establishing quantum link using the scheme of FIG. 2a above between two end nodes separated apart by a channel length of L may be determined as $L/L_0$. As such, the total number of quantum nodes are $N+1=L/L_0+1$, with $N-1=L/L_0-1$ intermediate quantum repeater nodes. Applying the scheme of FIG. 2 to the general N+1 quantum nodes, a total of $J=\log_2 N+1$ steps with $\log_2 N$ nesting levels of quantum entanglement swap operations may be implemented to achieve a quantum link between the two end nodes spanning N communication segments.

TriQ Algorithm for Quantum Link via Quantum Repeaters

FIG. 2b illustrates another example sequence 202 of quantum operations for establishing an end-to-end quantum link between two remote network nodes labeled as nodes 1 and 9 via seven quantum repeater nodes labeled as nodes 2-8 using quantum entanglement swap as described in FIGS. 1c-1f. The example sequence 202 is referred to as a "triQ" algorithm, the meaning of which will become apparent in the description below. The sequence 200 may include 5 steps with 4 nesting levels of quantum entanglement swap operations.

In Step triQ1 of FIG. 2b, a series direct single-segment quantum links within triads of quantum repeater nodes separated by other single quantum repeater nodes may be first established. For example, as shown by the solid arrows in Step triQ1, quantum links within a triad of repeater nodes 2, 3, and 4, and a triad of repeater nodes 6, 7, and 8 may be established. These two triads are separated by a single quantum repeater node 5.

In Step triQ2 of FIG. 2b, two first level of quantum entanglement swap operations between the first qubit and the second qubit in the middle quantum repeater nodes of the triads, e.g., quantum repeater nodes 3 and 7 may be performed, as shown by the dotted ovals illustrated in Step triQ2. Following such quantum entanglement swaps, quantum links each across two communication segments may be established, as shown by the solid linking lines in Step triQ2 of FIG. 2b. Further in Step triQ2, direct single-segment quantum link may be established between repeater 4 and 5, and repeater 5 and 6, as shown by the solid arrows in Step triQ2.

Further in Step triQ3, two second level of quantum entanglement swap operations are performed in quantum repeater nodes 3 and 7 among the remaining linked quantum nodes (e.g., quantum nodes 1, 4, 5, 6, 8), as shown by the dotted ovals in Step triQ3 of FIG. 2*b*. Following the second level quantum entanglement swap operations in Step triQ3 of FIG. 2*b*, quantum links spanning three communication segments are formed, as shown by the solid lines in Step triQ3. Further in Step triQ3, direct single-segment quantum link may be established between repeater 1 and 2, and repeaters 7 and 8, as shown by the solid arrows in Step triQ3.

Further in Step triQ4, a third level of quantum entanglement swap operations may be performed in the quantum repeaters 2 and 6, leading to the establishment of two quantum links each spanning four communication segments, as shown by the solid lines in Step triQ4.

In Step TriQ5, a fourth final level of quantum entanglement swap operation may be performed in the only remaining intermediate quantum repeater node (e.g., quantum repeater node 5), thereby establishing a direct quantum link between end quantum node 1 and end quantum node 9 spanning 8 communication segments, as shown by the solid line in Step triQ5 of FIG. 2*a*. After Step triQ5, the end-to-end long-range quantum link is established and used up in the communication. The quantum link may then need to be reestablished and the link sequence above and as shown in FIG. 2*b* repeats.

In the example of FIG. 2*b* above, a total of $\log_2(9-1)+2=5$ steps are used with $\log_2(9-1)+1=4$ levels of quantum entanglement swaps for $2^3+1=9$ quantum nodes including two end quantum nodes and $2^3-1=7$ intermediate quantum repeater nodes connectable by $2^3=8$ communication segments. In a practical quantum communication system, the length of a single communication segment may be denoted by $L_0$, as determined by factors such as fiber loss. A total number of communication segments needed for establishing quantum link using the scheme of FIG. 2*b* above between two end nodes separated apart by a channel length of L may be determined as $L/L_0$. As such, the total number of quantum nodes are $N+1=L/L_0+1$, with $N-1=L/L_0-1$ intermediate quantum repeater nodes. Applying the triQ scheme of FIG. 2*b* to the general N+1 quantum nodes, a total of $J=\log_2 N+2$ steps with $\log_2 N+1$ nesting levels of quantum entanglement swap operations may be implemented to achieve a quantum link between the two end nodes spanning N communication segments.

Nested Connection Loops for Gain in Connection Rate

For both the standard algorithm and triQ algorithm described above, the required number of steps and the number of quantum entanglement swap levels increase by 1 every time N doubles. For a typical noisy channel, and if the connection restarts afresh upon failure, the time to establish the end-to-end quantum link may have a polynomial dependence on $J=\log_2 N+1$ for the standard algorithm and $J=\log_2 N+2$ for the triQ algorithm, and thereby the connection rate drop significantly as the channel length increases. In the further alternative implementations below, the quantum repeater nodes, as they become idle in a current connection loop, are used or "recruited" to restart an inner connection loop of connection while the current connection loop is still ongoing, giving rise to a reduction of the total number of steps and levels of quantum entanglement swaps needed to make a successful connection, thereby providing a boost in the speed of connection. Multiple inner loops of connection may be nested as permitted by the resources. The boost of connection speed is obtained for N that is larger than a threshold value and increases for larger Ns or longer channel length. More inner connection loops can be created by strategically increasing the number of qubits at some repeaters.

Figure 7:
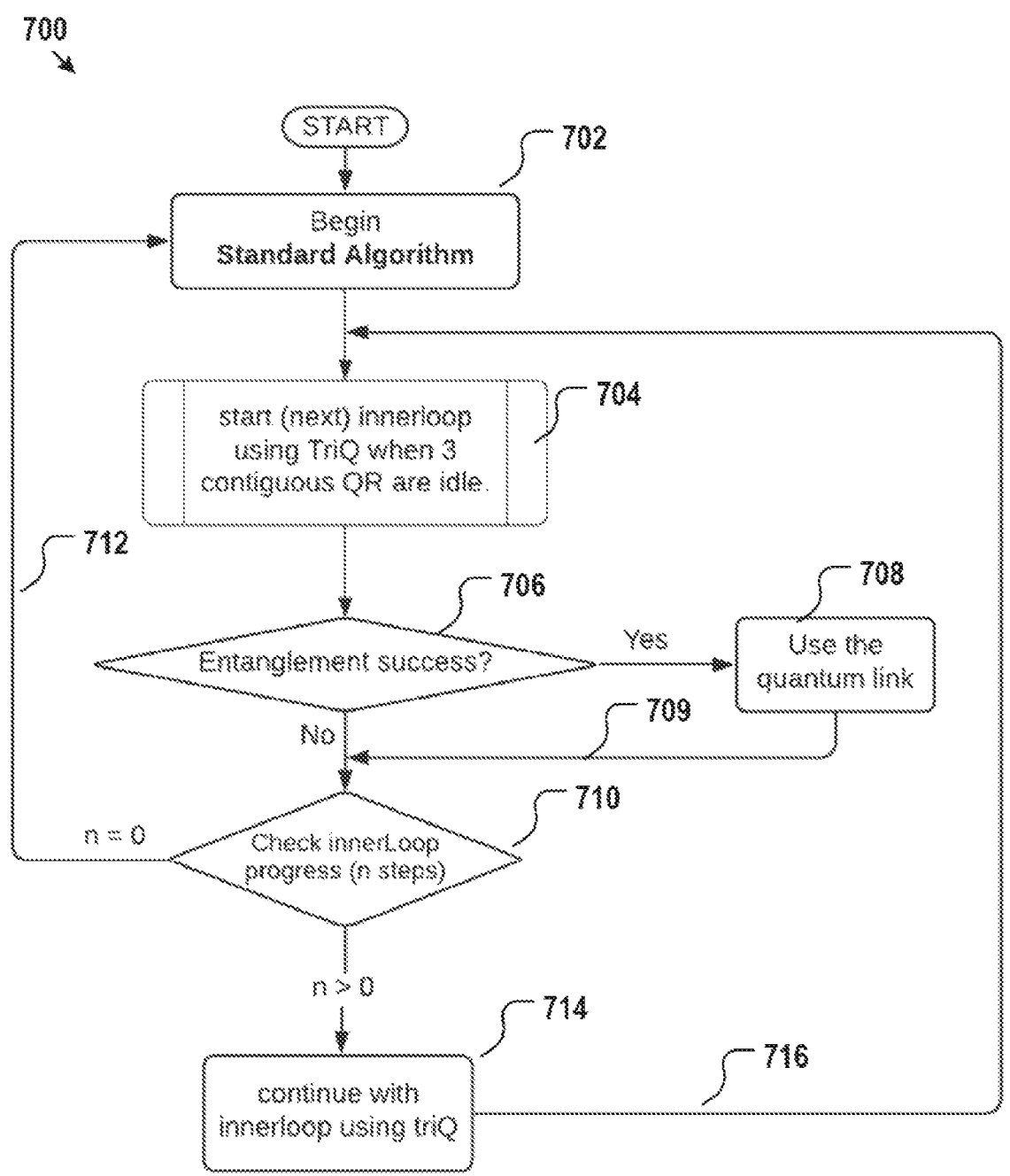
FIG. 7 shows an example logic flow for establishing a quantum link.
Figure 8:
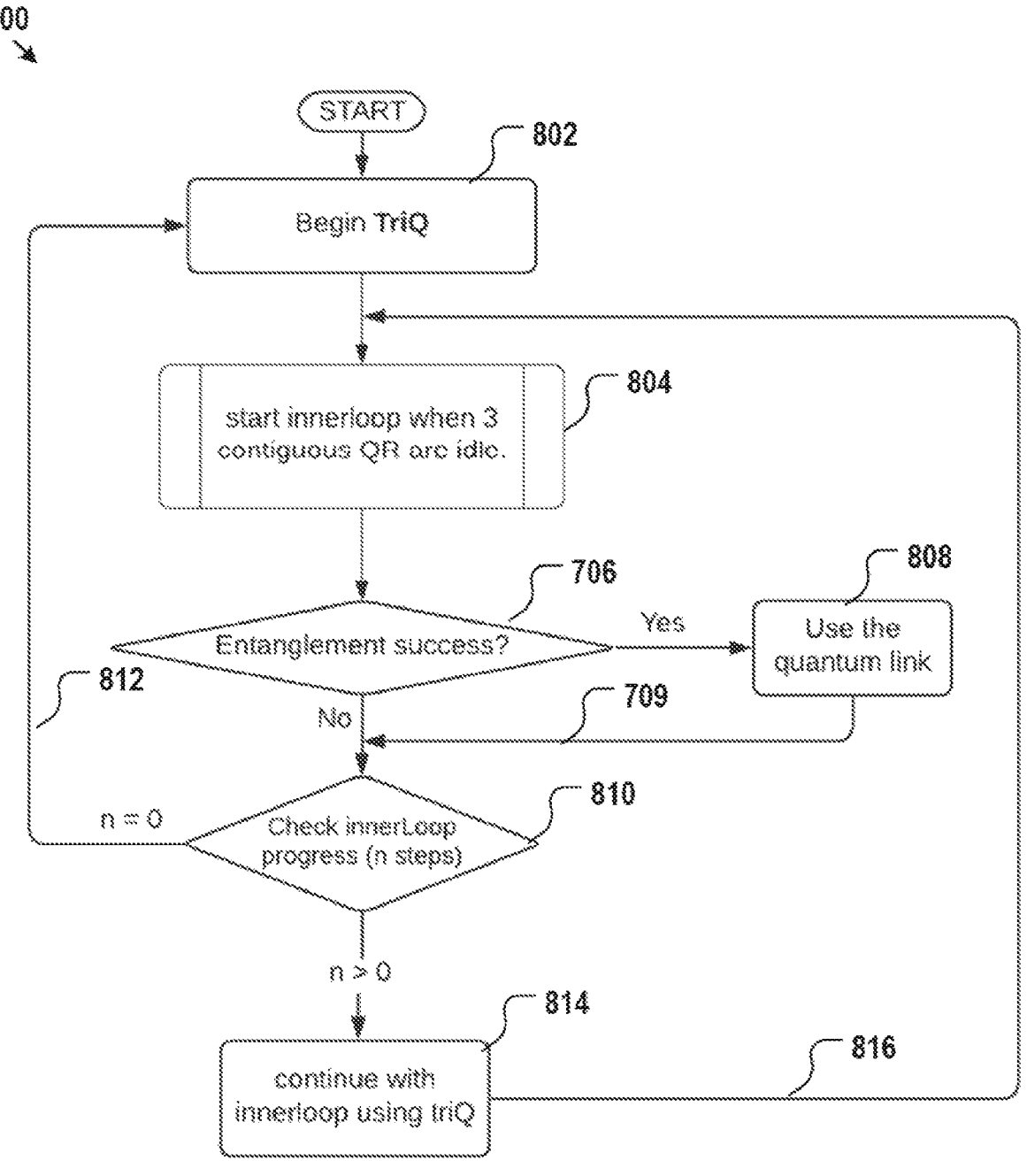
FIG. 8 shows another example logic flow for establishing a quantum link.

FIGS. 7 and 8 illustrate example logic flows for nesting quantum connection loops using the standard algorithm and/or triQ algorithm described above to improve connection speed and connection rate of an end-to-end quantum link across multiple communication segments.

For example, FIG. 7 shows an example logic flow 700 for establishing an end-to-end quantum link between two end nodes spanning N communication segments by starting with the standard algorithm (referred to as a main connection loop or main loop) for the quantum connection and nesting it with subsequent connection loops (referred inner connection loops or inner loops) based on the triQ algorithm. The logic flow 700 operates to increase the rate for the N-segment quantum communication channel by starting inner connection loops subsequently initiated when triads of neighboring quantum repeaters are freed up from their roles in a preceding connection loop. As such, in the case that a current connection loop fails, one or more inner loops for establishing the quantum connection would have already progressed forward, providing a head start and a gain in connection speed over having to restart the connection procedure afresh. As shown in further examples below, triads of idle quantum repeater nodes are available in step 4 of the standard algorithm, step 5 of the triQ algorithm, or earlier steps (e.g., when multiple qubit pairs are used in the quantum repeaters) regardless of the size of the network (N value). As such, the communication link rate gain can become significant for establishing quantum links spanning a large number of communication segments using the connection schemes described in this disclosure.

In the logic flow 700 of FIG. 7, the standard algorithm of FIG. 2*a* is used in a main connection loop. As shown in FIG. 7, the standard algorithm or connection loop starts at 702. After a number of steps in the standard algorithm (e.g., 4 steps as discussed above or when triads of quantum repeater nodes become idle at step 4 of FIG. 2*a*), the next inner loop using the triQ algorithm starts, as shown in 704. In 706, it is determined whether the standard algorithm fails (e.g., whether quantum entanglement operations in the standard algorithm are successful). If the standard algorithm is successful in establishing the end-to-end quantum link, such quantum link is used as shown by 708 and the logic flow 700 continues to 710, as shown by arrow 709. However, if the standard algorithm fails, the progression of the inner connection loop with the triQ algorithm started at 704 is determined, as shown by 710. If the inner connection loop has not progressed far enough, then the standard algorithm restarts, as shown by the arrow 712. If the inner loop has progressed far enough, then the inner connection loop is allowed to continue to proceed further for establishing the quantum link, as shown by 714. In the meanwhile, more nesting inner loops are created, as shown by arrow 716 and block 704, when triads of quantum repeater nodes again becomes available (e.g., after 5 steps in its proceeding inner loop).

In FIG. 7, because an inner connection loop using the triQ algorithm takes one extra step than the standard algorithm (main connection loop) to complete, the determination progression threshold in block 710 would be n=1. As such, as long as the inner connection loop has completed at least one step (n>0), block 714 is followed next. The arrow 712 is followed only when the first step of the inner connection loop has not completed successfully (n=0).

In the logic flow 800 of FIG. 8, the triQ algorithm rather than standard algorithm is used in starting the main connection loop. As shown in FIG. 8, the triQ algorithm or connection loop starts at 802. After a number of steps in the triQ algorithm (e.g., 5 steps as discussed above or when triads of quantum repeater nodes become idle at step 5 of FIG. 2*b*), the next inner loop also using the triQ algorithm starts, as shown in 804. In 806, it is determined whether the main connection loop fails (e.g., whether quantum entanglement operations in the main loop triQ algorithm are successful). If the standard algorithm is successful in establishing the end-to-end quantum link, such quantum link is used as shown by 808 and the logic flow 800 continues to 810, as shown by arrow 809. However, if the main loop fails, the progression of the inner connection loop with the triQ algorithm started at 804 is determined, as shown by 810. If the inner connection loop has not progressed far enough, then the main connection loop restarts, as shown by arrow 812. If the inner loop has progressed far enough, then the inner connection loop is allowed to continue to proceed further for establishing the quantum link, as shown by 814. In this particular implementation, because the main loop and the inner loop both use the same triQ algorithm, as soon as the first inner loop has started without failure (n>0), it continues. Otherwise the main loop starts afresh. In the meanwhile, more nesting levels of inner loops with the triQ algorithm are created, as shown by arrow 816 and block 804, when triads of quantum repeater nodes again become available (e.g., after 5 steps in its proceeding inner connection loop).

Example Implementations Using Both the Standard and the TriQ Connection Algorithms in Nested Connection Loops As an example of the logic flow 700 of FIG. 7, FIG. 3 illustrates a sequence of quantum operations 300 with two or more nested connection loops for establishing an end-to-end quantum link between two end quantum nodes via seven quantum repeater nodes (for a total of N+1=9 quantum nodes with N=8 communication segments) using 3 nested levels of quantum entanglement swap operations. In FIG. 3, the nested connection loops include a main connection loop based on the standard algorithm as represented by 302 and including steps 1-4 denoted as S1 through S4, and one or more inner connection loops using the triQ algorithm such as inner connection loop 304 including steps 4-8 denoted as S4 through S8 and further inner connection loops 306. The connection loops 302, 304, and 306 are nested as they overlap by at least one step (e.g., step S4 between 302 and 304 or S8 between 304 and 306).

In FIG. 3, the main loop 302 including steps S1-S4 are similar to the sequence of connection Steps 1-4 in the standard connection algorithm of FIG. 2*a*, except that at Step 4, the inner loop connection 304 starts prior to a completion of establishing the end-to-end quantum link between node 1 and node 9.

The inner loop 304 of the connection sequence 300 in FIG. 3 using the triQ algorithm of FIG. 2*b* starts at step S4, where two consecutive groups of intermediate quantum repeater nodes have become idle from the main connection loop 302 before the main connection loop 302 completes. The first group of intermediate quantum repeater nodes include nodes 2, 3, and 4, whereas the second group of intermediate quantum repeater nodes include nodes 6, 7, and 8. To start the inner connection loop, direct quantum links within each of these groups of idle quantum repeater nodes are generated, as shown by the solid arrows between these idle nodes in step S4 of FIG. 3.

In step S5 of the inner connection loop 304, quantum entanglement swap operations are performed in quantum repeater nodes 3 and 7, thereby creating quantum link between nodes 2 and 4, and between nodes 6 and 8 for the inner connection loop 304, as shown by the curved link lines between these nodes in step S5 of FIG. 3. Optionally in step S5, as quantum repeater node 5 has also become idle from the main connection loop, direct single-segment quantum links can be created between nodes 4 and 5, and between nodes 5 and 6, as shown by the solid link arrows between these nodes in step S5 of FIG. 3. The quantum entanglement swap operations and the direct single-segment quantum link establishment operations in step S5 do not interfere with one another, as they involve different qubits of the qubit pairs in nodes 4 and 5.

In step S6 of the inner connection loop 304, quantum entanglement swap operations are performed in quantum repeater nodes 4 and 6, thereby creating quantum link between nodes 2 and 5, and between nodes 5 and 8 for the inner connection loop 304, as shown by the curved link lines between these nodes in step S6 of FIG. 3.

In step S7 of the inner connection loop 304, quantum entanglement swap operations are performed in quantum repeater nodes 2 and 8, thereby creating a quantum link between nodes 1 and 5, and between nodes 5 and 9 for the inner connection loop 304, as shown by the curved link lines between these nodes in step S7 of FIG. 3.

Finally, in step S8 of the inner connection loop 304, a quantum entanglement swap operation is performed in quantum repeater node 5, thereby creating end-to-end quantum link between nodes 1 and 9 for the inner connection loop 304, as shown by the curved link line between nodes 1 and 9 in step S8 of FIG. 3.

Before the inner connection loop 304 completes in step S8, two groups of consecutive quantum repeater nodes (the group of nodes 2, 3, 4, and the group of nodes 6, 7, and 8) again become idle from the inner connection loop 304. A second inner connection loop 306 nested with the first inner connection loop 304 may be started following similar steps of the triQ algorithm of Step S4-S8. As shown in FIG. 3, the main connection loop 302 use the standard algorithm and takes 4 steps and 3 nested levels of quantum entanglement swap operations to complete, whereas the inner connection loop 304 using the TriQ algorithm takes one more step (a total of steps) and one more nested level of quantum entanglement swap operations (a total of 4 levels) to complete.

Figure 4:
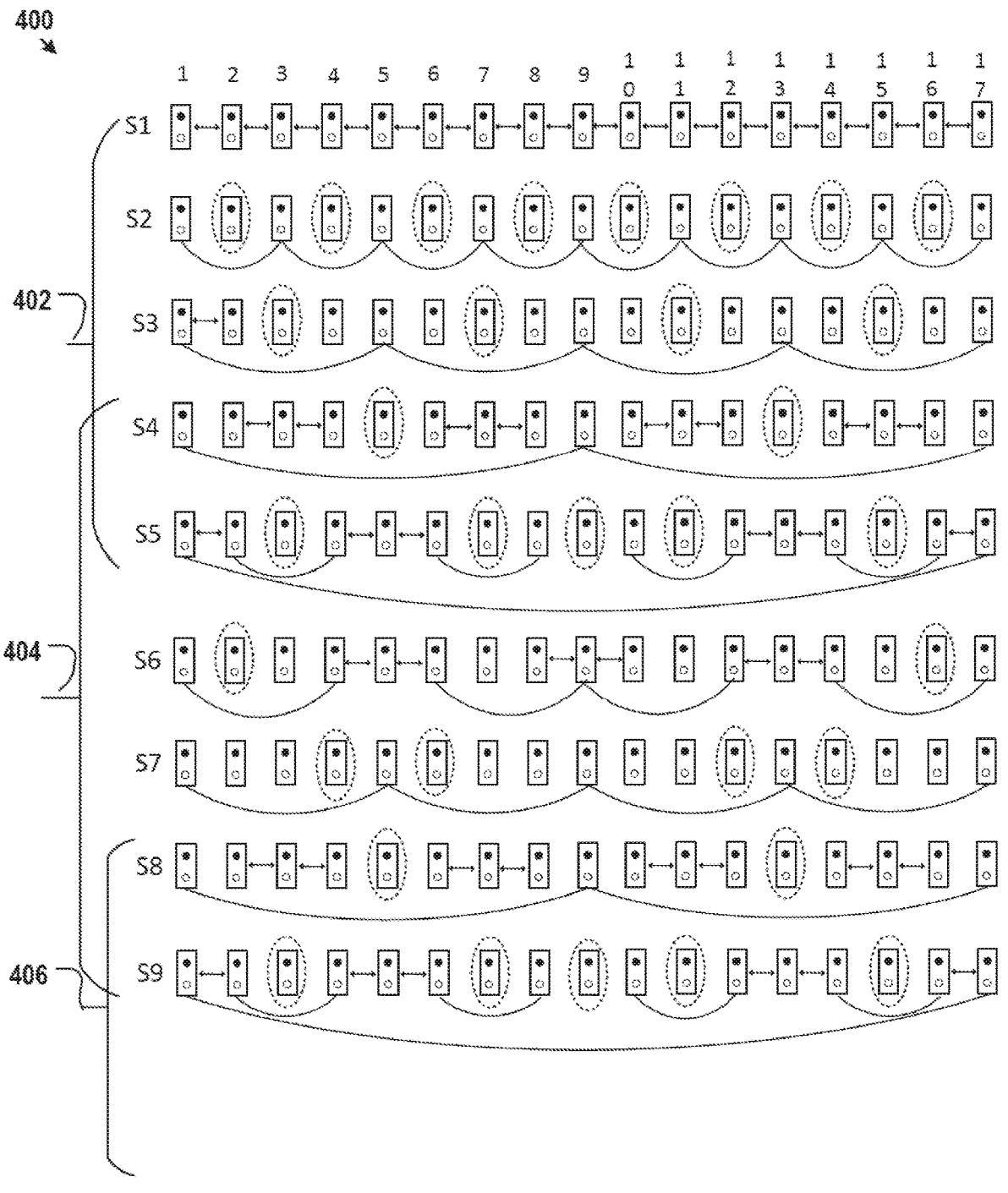
FIG. 4 illustrates another example sequence of quantum operations with a series of nested connection loops for establishing an end-to-end quantum link between two end network nodes via fifteen quantum repeater nodes using nested levels of quantum entanglement swap operations.

The multi-loop connection scheme of FIG. 7 with mixed standard algorithm and triQ algorithm is applicable to quantum network with channel length larger than N=8. For example, FIG. 4 shows a sequence of quantum operations 400 with multiple nested connection loops for establishing an end-to-end quantum link between two end quantum nodes via 15 quantum repeater nodes (for a total of N+1=17 quantum nodes with N=16 communication segments) using nested levels of quantum entanglement swap operations. In FIG. 4, the nested connection loops include a main connection loop 402 running steps S1-S5 of the standard algorithm, and inner connection loops including inner connection loop 404 with steps S4-S9 and inner connection loop 406 running the triQ algorithm. The connection loops 402, 404, and 406 are nested as they overlap by at least two steps (e.g., step S4-S5, or steps S8-9).

In FIG. 4, the main connection loop 402 including steps S1-S5 are similar in operation principles to the sequence of connection Steps 1-4 in FIG. 2a using the standard algorithm except that it takes one additional step to establish the end-to-end quantum link between nodes 1 and 17 (as the channel length N doubles in FIG. 4 compared to FIG. 3).

Compared to the example inner connection loop 304 of FIG. 3, the first inner connection loop of 404, however, can start at step S4, one additional step ahead of the last step (S5) in completing the final quantum link between nodes 1 and 9, as several groups of consecutive intermediate quantum repeater node triads (group 2, 3, 4, group 6, 7, 8, group 10, 11, 12, and group 14, 15, 16) become idle relatively earlier.

Before the first inner connection loop 404 using the triQ algorithm completes in step S9, the four groups of consecutive quantum repeater nodes (the group of nodes 2, 3, 4, and the group of nodes 6, 7, 8, group 10, 11, 12, and group 14, 16) again become idle at step S8 from the first inner connection loop 404. The second inner connection loop 406 nested with the first inner connection loop 404 may be started at step S8 following similar steps of S4-S9 using the triQ algorithm.

The inner connection loop 404 (or 406) as illustrated in S4-S9 of FIG. 4 using the triQ algorithm takes 6 steps, or one more step to complete compared to the main connection loop 402. Further, the inner connection loop 404 includes 5 nested levels of quantum entanglement swap operations, with one additional level compared to the 4 nested levels of quantum entanglement swap operations in the main connection loop 402 using the standard algorithm.

The implementations of FIGS. 7, 3, and 4, in which standard algorithm and triQ algorithm are mixed may be expanded to a quantum network having a channel length of N communication segments. The numbers of steps and nested levels of quantum entanglement swap operations as a function of the channel length N are as follows.

The main connection loop using the standard algorithm takes $\log_2 N+1$ steps to complete;

The inner connection loops using the triQ algorithm each takes $\log_2 N+2$ steps to complete;

The main connection loop includes $\log_2 N$ nested levels of quantum entanglement swap operations;

The inner connection loops each includes $\log_2 N+1$ nested levels of quantum entanglement swap operations.

Each inner connection loop starts when one or more groups of three consecutive intermediate quantum repeater nodes (referred to as triads) become idle from the proceeding connection loop;

Each inner connection loop can start at step 4 of a previous main connection loop or step 5 of a preceding inner connection loop;

The overlapping between two consecutive connection loops are $\log_2 N-2$, and

Other than an initial lag for the first step, the reconnection process represented by the inner loops proceeds at the same rate irrespective of the channel length.

Figure 5:
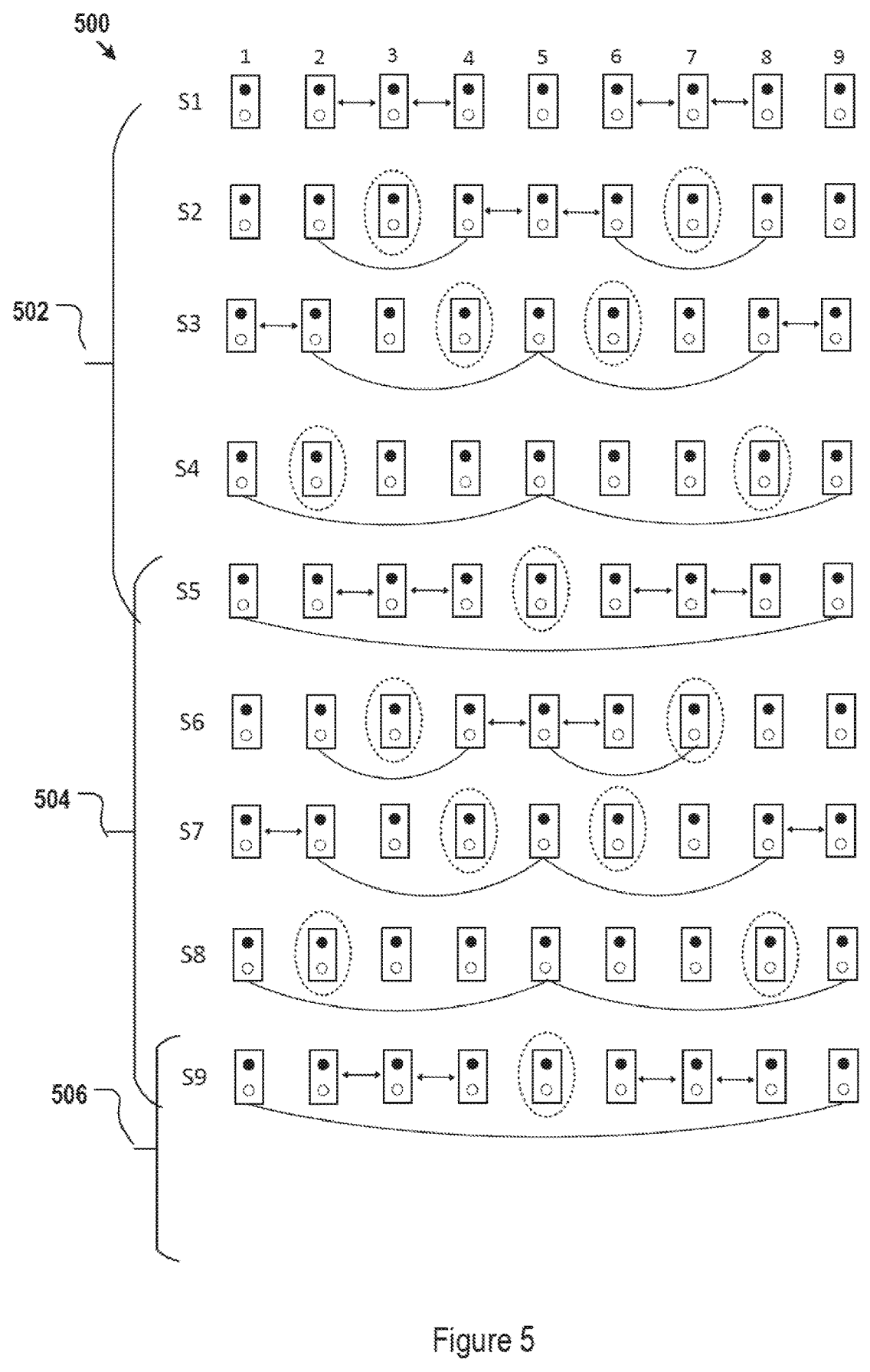

Example Implementations Using the TriQ Connection Algorithm in Nested Connection Loops Turning back to the logic flow 800 of FIG. 8 using only the triQ algorithm, an example implementation in a quantum network having a channel length of 8 communication segments (N=8) and 9 quantum nodes is shown in 500 of FIG. 5. Specifically, the main connection loop of FIG. 5 is shown as 502, whereas the inner connection loops are shown as 504 and 506. In comparison to FIG. 3, both the main connection loop and the inner loops of the logic flow 500 of FIG. 5 uses the triQ algorithm. As such, both the Steps S1-S5 of the main connection loop 502 and the Steps S5-S9 of the inner connection loop 504 are identical to Steps 1-5 of FIG. 2b. Description of these steps are not repeated herein for FIG. 5. Consecutive connection loops in FIG. 5 overlap by 1 step.

Figure 6:
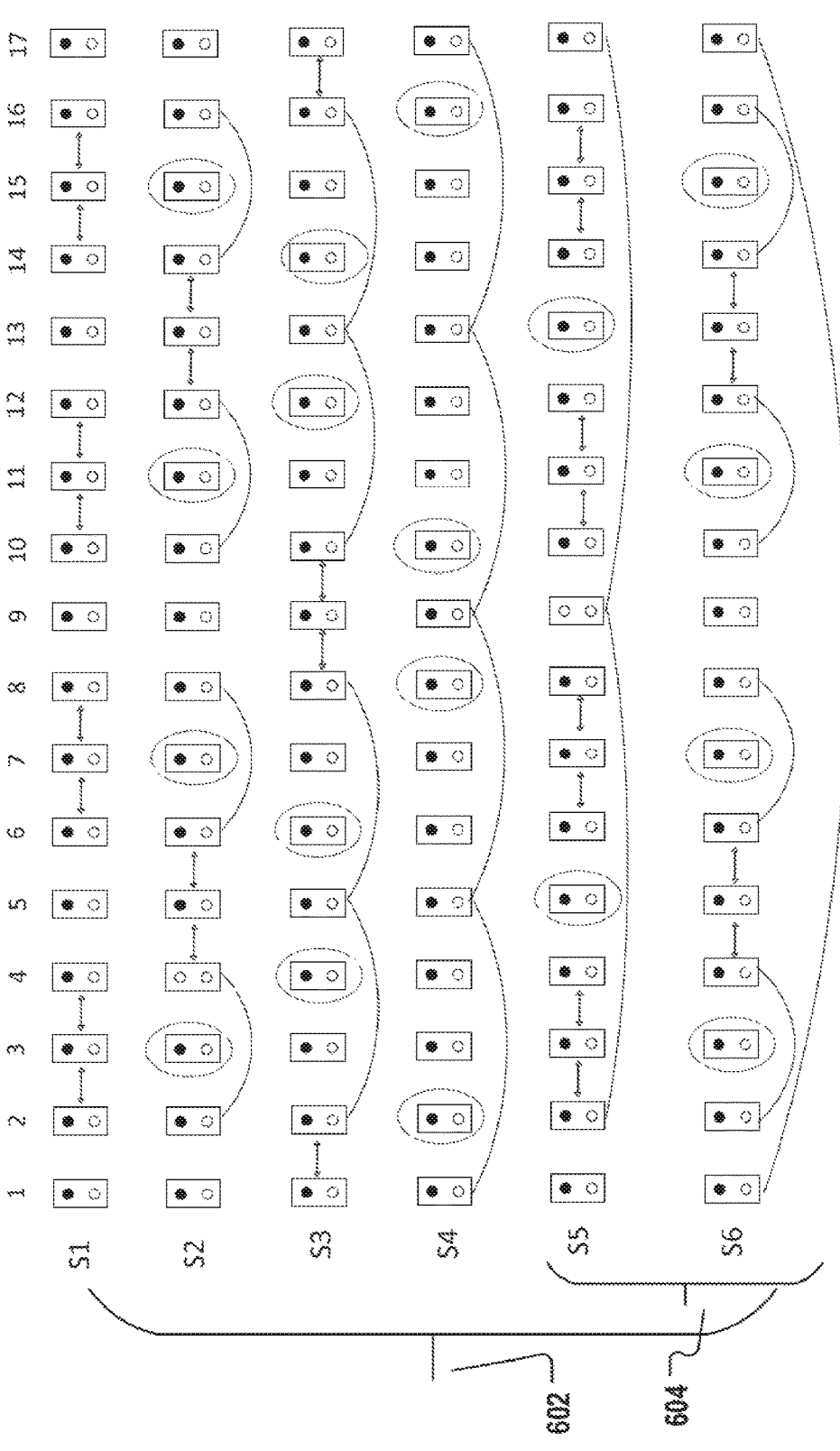
FIG. 6 illustrates another example sequence of quantum operations with a series of multiple nested connection loops for establishing an end-to-end quantum link between two end network nodes via fifteen quantum repeater nodes using nested levels of quantum entanglement swap operations.

FIG. 6 further shows another example 600 of the logic flow 800 of FIG. 8 as applied to a quantum network with a channel length of 16 communication segments (N=16) and 17 quantum nodes. The main connection loop is shown as 602 and the first inner connection loop is shown as 604. Compared to FIG. 5, the main and inner connection loops 602 and 604 each involves 6 steps for the triQ algorithm rather than 5 steps, as the channel length increases by 1 compared to FIG. 5. Each loop contains 5 nested levels of quantum entanglement swap operations. Consecutive connection loops in FIG. 6 overlap by 2 steps.

Figure 9:
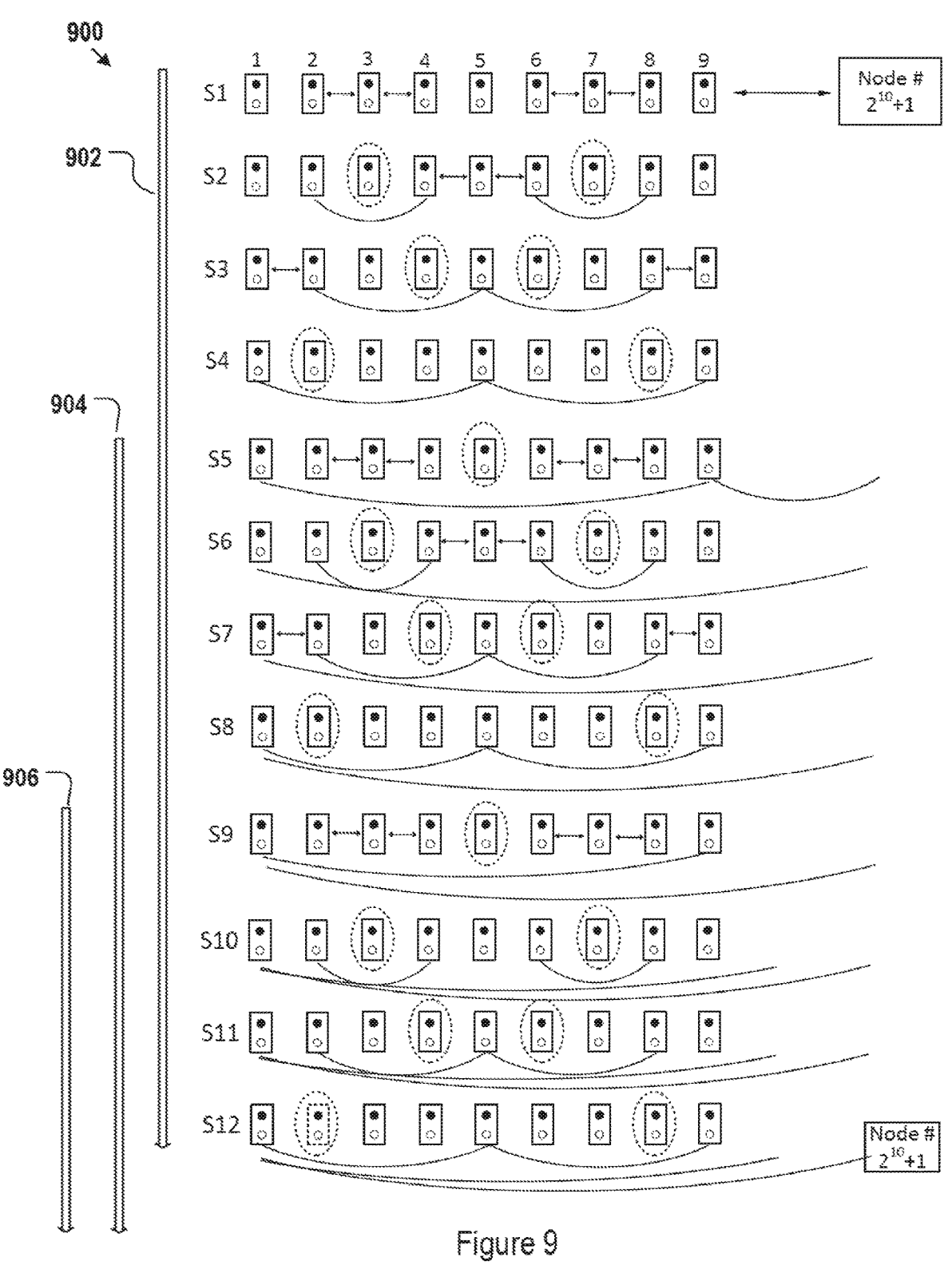
FIG. 9 illustrates another example sequence of quantum operations with a series of multiple nested connection loops for establishing an end-to-end quantum link between two end network nodes via $2^{10}-1$ quantum repeater nodes using nested levels of quantum entanglement swap operations.

The operation principles above as described in FIGS. 8, 5, and 6 in which only the triQ algorithm is used may be expanded a quantum network having a channel length of N communication segments, as further illustrated in FIG. 9. In particularly, a quantum network with N+1 nodes and N communication segments may be divided into two groups of nodes sharing one common node in the middle of the communication channel. End-to-end quantum link in each connection loops of each of the groups of the quantum nodes may be established in parallel first using the scheme described above, followed with an extra quantum entanglement swap operation at the shared quantum nodes between the two groups to establish the final end-to-end quantum link between node 1 and node N+1. Likewise, each of the group of quantum nodes may be divided into two sub groups in a similar manner above for establishing the end-to-end quantum link between the first node and the last node of the group of quantum nodes. The process above iterates to form the steps of a procedure for establishing end-to-end quantum link between node 1 and node N+1 of the N+1 node quantum network. As such, the scheme of quantum linking above can be expanded for the 9-node network of FIGS. 2 and 3 to networks of any number of nodes and communication channel lengths.

FIG. 9 illustrates this process using only the triQ algorithm. Specifically, FIG. 9 shows a quantum link establishment procedure 900 in a quantum network with a series of $2^{10}+1$ (e.g., $N=2^{10}$) quantum nodes (including two end nodes and $2^{10}-1$ quantum repeater nodes). The main connection loop is shown as 902 and the first and second inner connection loops are shown by 904 and 906, respectively. All connection loop takes 12 steps to complete and consecutive connection loops overlap by 8 steps.

As further shown in FIG. 9, the $2^{10}+1$ quantum nodes may be divided into two groups: a first group including nodes 1 to $2^9+1$, and a second group including nodes $2^9+1$ to $2^{10}+1$. End-to-end quantum link within each of the two groups of quantum nodes may be established following parallel steps for a quantum network of $2^9+1$ nodes, and the quantum link between node 1 and node $2^{10}+1$ can be established using an extra step in which a quantum entanglement swap is performed at quantum repeater node $2^9+1$ (the quantum node shared by the two groups). The main operation loop 902, for example, includes 11 steps for the first group and the second group in parallel and one quantum entanglement swap step for linking the two groups, a total of 12 steps. The end-to-end quantum link for each of the group may be established by recursively following the approach above. This particular aspect of FIG. 9 is also applicable to the implementations in which a mixture of the standard algorithm and the triQ algorithm is used.

The numbers of steps and nested levels of quantum entanglement swap operations as a function of the channel length N for the implementations of FIGS. 8, 5, 6 and 9 using the triQ algorithm only are as follows.

The main and inner connection loops take $\log_2 N+2$ steps to complete;

The main and inner connection loops each includes $\log_2 N+1$ nested levels of quantum entanglement swap operations;

Each connection loop starts when one or more groups of three consecutive intermediate quantum repeater triad nodes become idle from the proceeding connection loop;

Each connection loop can start at step 5 of a previous connection loop;

The overlapping between two consecutive connection loops are $\log_2 N-2$ steps;

The reconnection process represented by the inner loops proceeds at the same rate irrespective of the channel length;

The number coexisting nesting inner loops can be as many as N/4.

Figure 10:
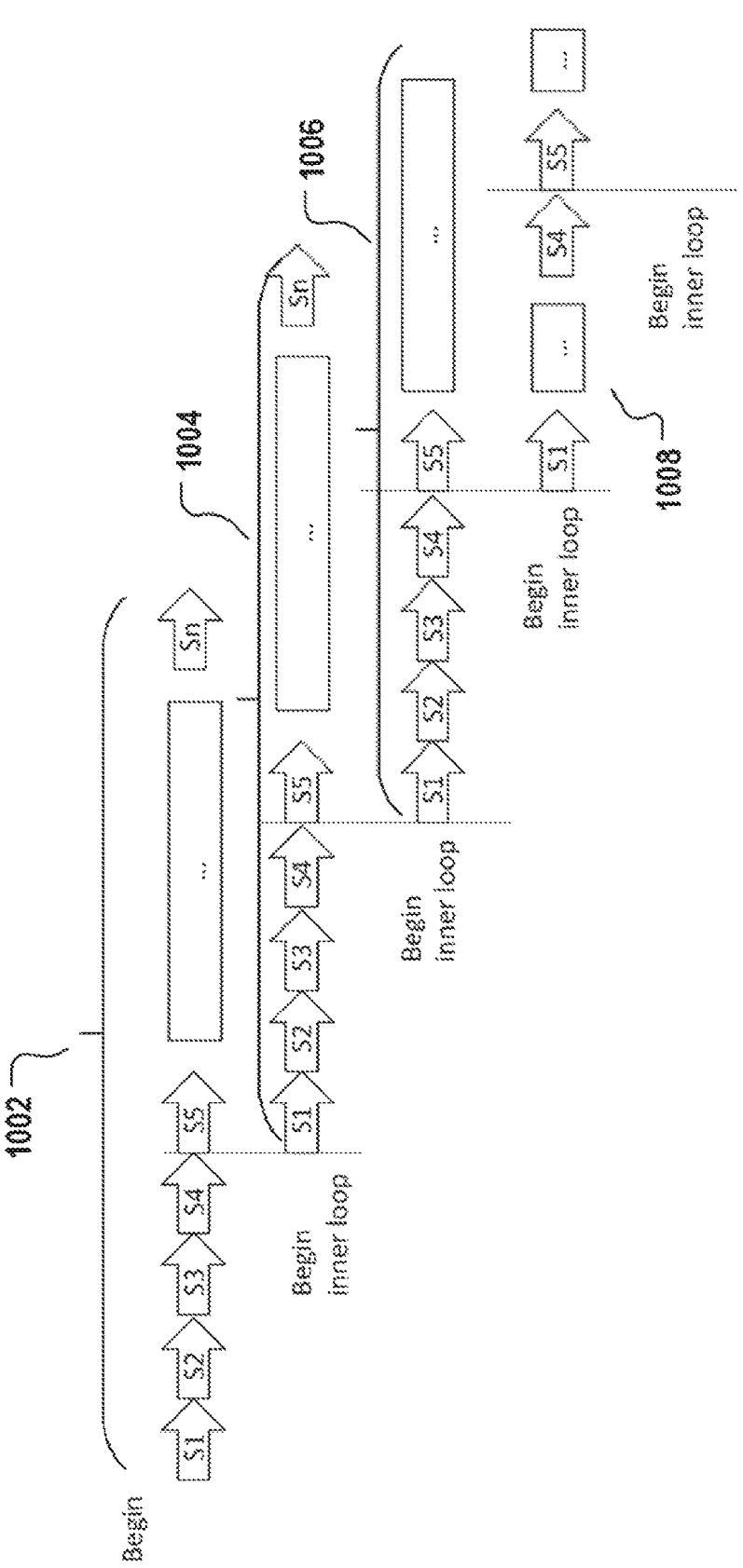
FIG. 10 illustrates a generalization of the sequences of quantum operations to N+1 nodes (with N−1 quantum repeater nodes) to achieve an end-to-end quantum link using nested levels of quantum entanglement swap operations.

The extension of the processes as described in FIGS. 8, 5, 6, and 9 above to the communication network having N communication segments (N+1 nodes with N−1 repeaters) is further illustrated in FIG. 10. In FIG. 10, the main connection loop using the triQ algorithm is shown as 1002. The first inner connection loop is shown as 1004. The second inner connection loop is shown as 1006. A third inner connection loop is shown as 1008. The connection loops are each implemented in $\log_2 N+2$ steps. All inner connection loops start at the fifth step of the corresponding proceeding loops. Extension of the process of FIGS. 7, 3, and 4 can be similarly extended to the N+1 system, except that main connection loop is based on the standard algorithm and takes $\log_2 N+1$ steps to complete, and that the first inner connection loop starts at the $4^{th}$ step of the main connection loop.

Using More than One Qubit Pairs in Some Repeaters

In some other implementations, additional qubit pairs at certain repeaters nodes in the sequence may be used for starting the inner loops using the triQ algorithm earlier than the step 4 or step 5 in the implementations described above. For example, if in FIG. 3, node 3 and node 7 each had an additional pair of qubits. The inner loop could be started at step 3 instead of step 4 because triads of quantum repeaters would be available at step 3 with these additional pairs of qubits Connection Gains and Inter-Node Distance Optimization In the implementations above, the main connection loop and the inner connection loops may be nested to achieve faster end-to-end connections. Without the inner loops, the failure of any of the steps of the main connection loop would require the main connection loop to start over. With the inner connection loops nested with the main connection loop, and if the main connection loop fails at a later step where an inner connection loop has already started and advanced at least one step already, the main loop would not need to be restarted because the inner connection loop would be expected to complete its connection at or before the time that a restarted main loop could complete its connection. Likewise, if the inner loop fails at a later step, another inner step would have already started. The head start of the inner connection loops and the continuation of the connection stages where the inner connection loop is at are essentially the primary source of the rate gain in establishing the end-to-end multi-segment quantum link or connection.

Figure 11:
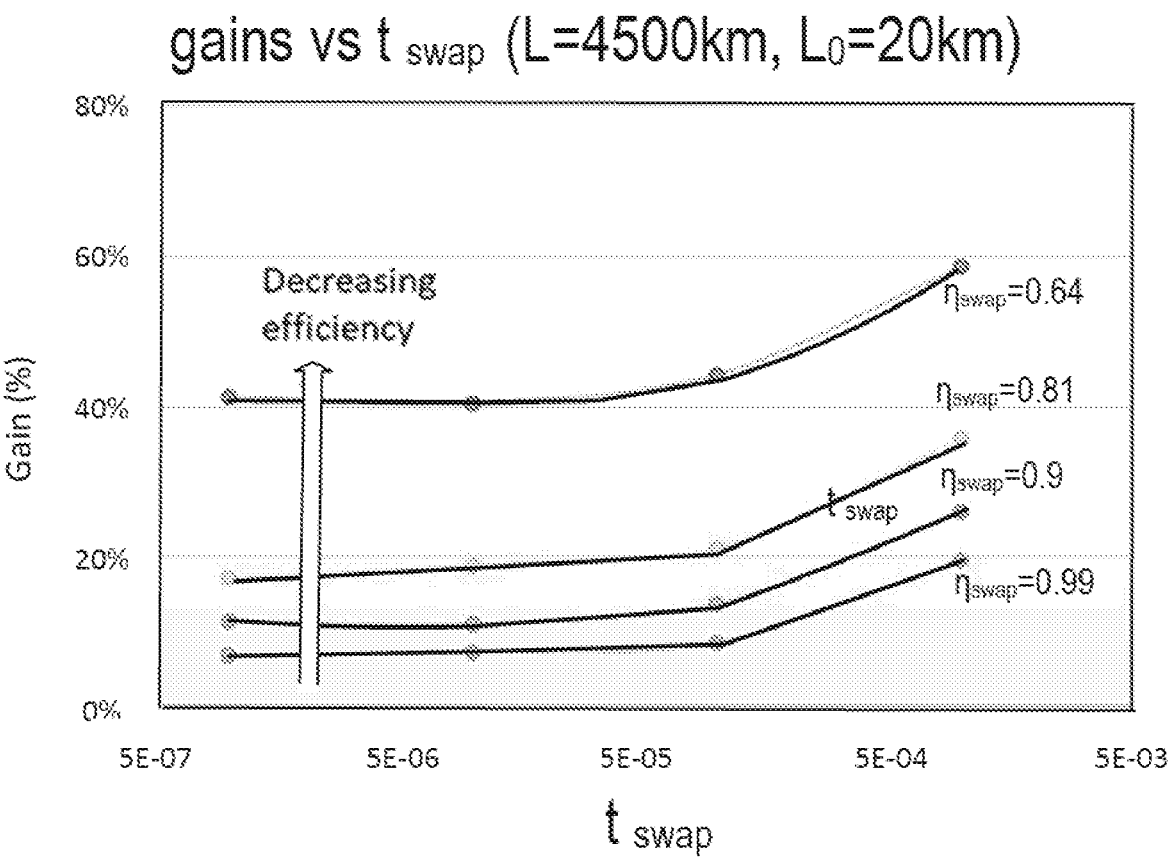
FIG. 11 illustrates a Monte Carlo simulation showing connection rate gain in an example quantum communication network using nested connection loops.

As described above, the primary gain of connection rate comes from the head start of the inner connection loops and the continuation of the connection stages at where an inner connection loop is at. FIG. 11 shows simulated gain in connection rate using the algorithm above as a function of quantum entanglement swap operation time ($t_{swap}$) and efficiency ($\eta_{swap}$). The results are obtained by Monte Carlo simulation of a quantum network spanning 4500 km with communication segments of 20 km. As shown in FIG. 11, the connection rate gain increases for lower efficiency quantum entanglement swap operations, and for quantum entanglement swap operations needing longer operation time.

Figure 12:
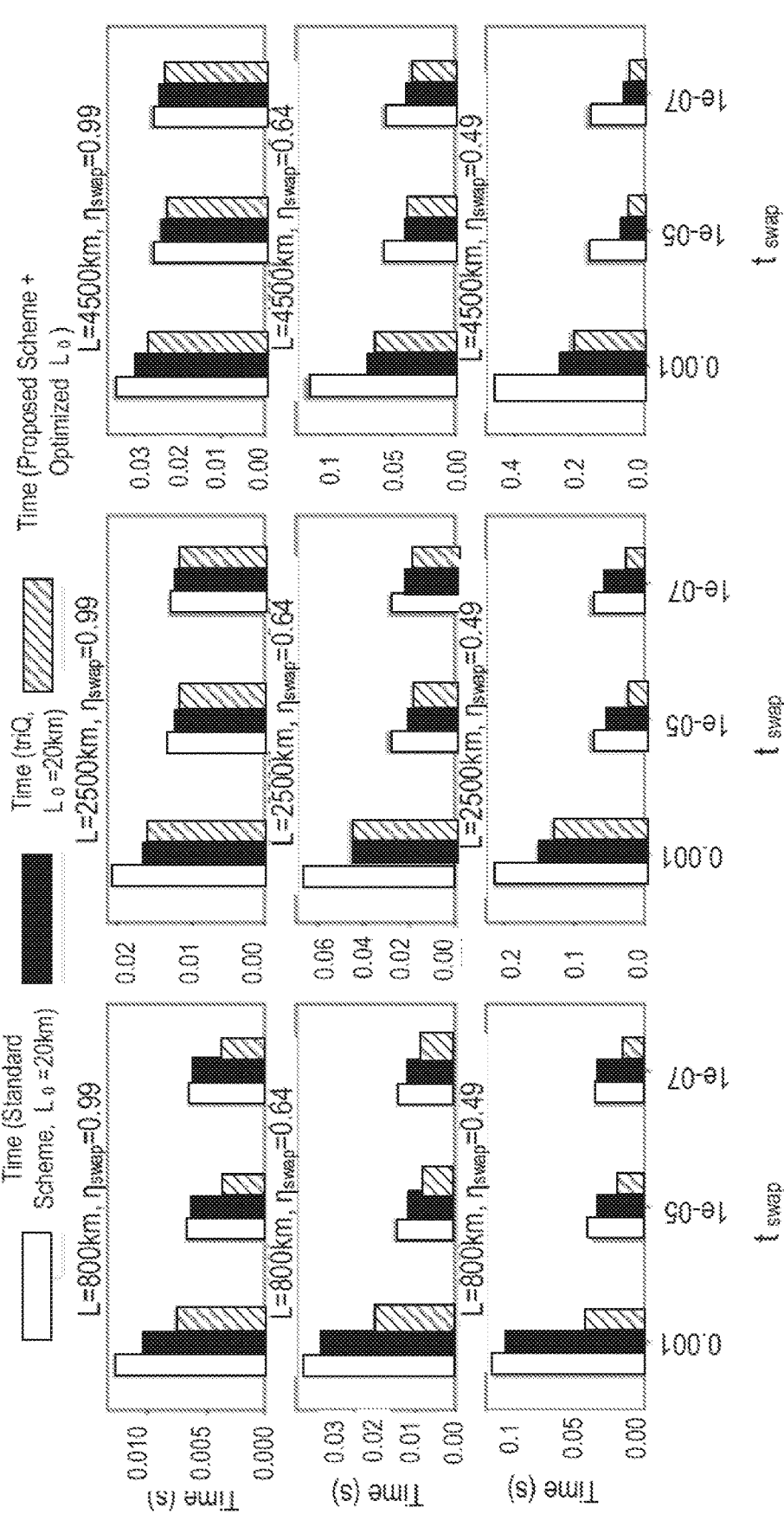
FIG. 12 shows simulated quantum link connection time with or without inter-repeater distance optimization as a function of link length, quantum entanglement swap efficiency and time.

Additional gain in connection rate can be made by using the method above while optimizing inter-repeater distance. As an example, FIG. 12 illustrates connection gain (in connection time, shorter connection times represent gains) using the method above versus using a standard scheme of repeating a main loop without inner connection loops, with or without inter-repeater distance optimization, and as a function of quantum entanglement swap operation time and efficiency, and link distance. As shown by FIG. 12, a further connection rate gain is obtained by optimizing inter-repeater distances.

Example Implementation of Quantum Repeaters

There may be multiple example manners in which quantum links or quantum entanglement between qubits between neighboring nodes (the solid connection arrows in FIGS. 1-6 and 9) may be established. For example, the qubits may be implemented using nitrogen vacancy centers in solid state materials (such as diamond) or other systems (such as trapped ions) supporting two non-degenerate low energy quantum levels (represented by $|\uparrow\rangle$ and $|\downarrow\rangle$) and one high energy level (represented by $|e\rangle$) forming a lambda system. This two low-energy states forms the basis of the qubit. Quantum entanglement between two such qubits may be achieved by first initializing the qubits in the state $(|\uparrow\rangle + |\downarrow\rangle)/\sqrt{2}$. A resonant laser pulse may then be used to induce the transition $|\uparrow\rangle \rightarrow |e\rangle$. An emission of a photon after this resonant excitation entangles the qubit and photon number (no emission represented by $|0\rangle$ and emission by $|1\rangle$ respectively) into an entangled state represented by $(|\uparrow 1\rangle + |\downarrow 0\rangle)/\sqrt{2}$. If this same operation is performed simultaneously at two locations A and B, entangled states $(|\uparrow_A 1_A\rangle + |\downarrow_A 0_A\rangle)/\sqrt{2}$ and $(|\uparrow_B 1_B\rangle + |\downarrow_B 0_B\rangle)/\sqrt{2}$ may be generated respectively at the two locations, and a combined state can be written as $$\frac{|\uparrow_A \uparrow_B 1_A 1_B\rangle + |\downarrow_A \downarrow_B 0_A 0_B\rangle + |\uparrow_A \downarrow_B 1_A 0_B\rangle + |\downarrow_A \uparrow_B 0_A 1_B\rangle}{2},$$

where $|0_A 0_B\rangle$ represents no emission at either of the two qubits and $|1_A 1_B\rangle$ represents emission at both qubits. The basis photon states that may be utilized for quantum communication may include states in which emission is at only one of the qubits i.e. either $|1_A 0_B\rangle$ or $|0_A 1_B\rangle$. If the photons are in this state, the qubits would be projected at the state $$\frac{|\uparrow_A \downarrow_B\rangle + |\downarrow_A \uparrow_B\rangle}{2}.$$

This is realized by routing the possible excitation from both qubits to a 50:50 beam splitter and then detecting using two single photon detectors. Assuming no loss of photon, in the case of only one detector registering a photon, it may be determined that the qubits are in the desired entanglement state. Such a setup may be referred to as a Bell State Measurement (BSM).

Each quantum repeater above includes at least a pair of qubits. Using the method above, the first qubit of a repeater and a second qubit of a neighboring repeater may be entangled, forming an entanglement chain, as described above in relation to FIG. 1. For the quantum entanglement swap operation to entangle two qubits across an intermediate quantum repeater may be implemented in various manners. For example, appropriate excitations stored in quantum memory can be retrieved from the qubits as photons and a BSM setup may be used to entangle these photons. Alternatively, the qubits can also be entangled using a series of two qubit operations that do not involve photon recall.

Figure 13:
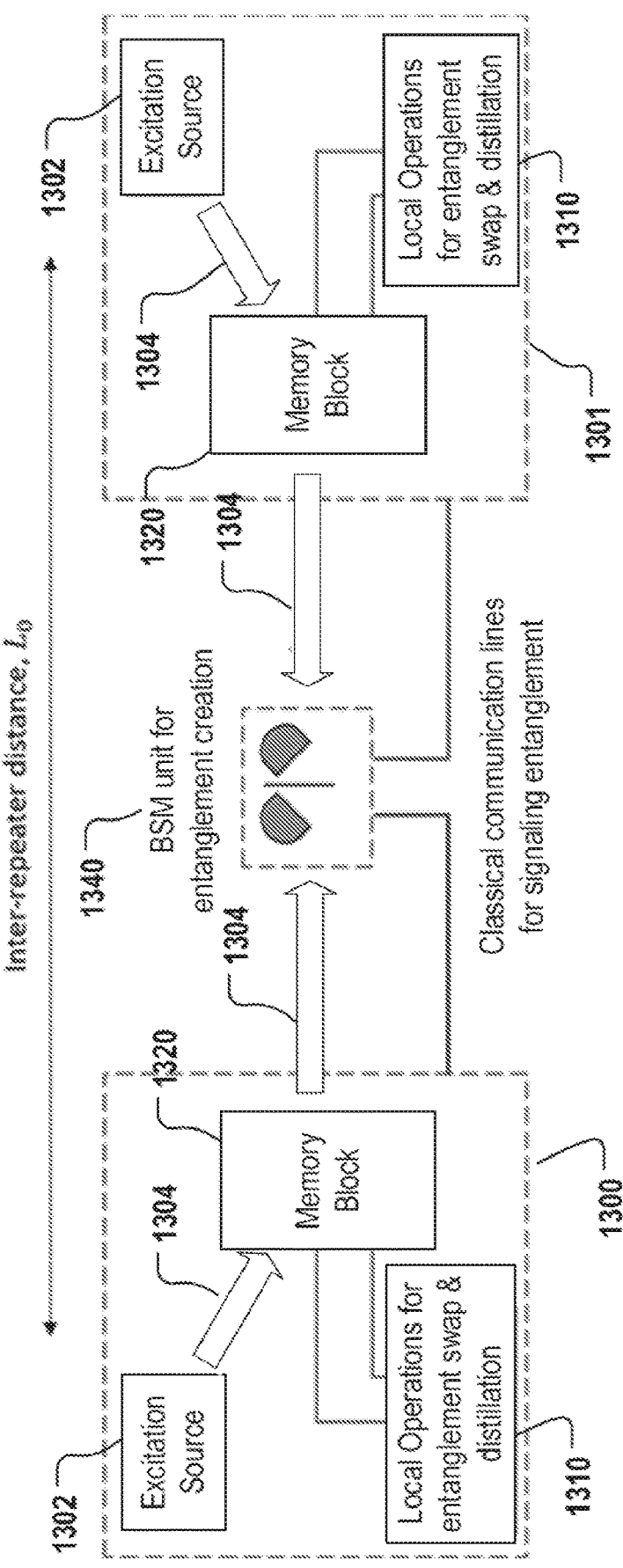
FIG. 13 illustrates example components of quantum repeaters and example mechanism for entangling qubits between the quantum repeaters.

FIG. 13 shows example quantum repeaters (1300 and 1301) including a laser source 1302 for (local) entanglement creation between the qubit and photon number (arrows 1304), a control unit (1310) that can perform (local) single and two qubit operations that would enable initialization and entanglement swapping, and finally a memory unit (1320) which implements the qubits. The term "local" here implies at the repeater. FIG. 13 represents the case of two repeaters (1300 and 1301, each represented by a dashed box in FIG. 13) where photons from the two qubits (at the two different repeaters) incident on the BSM setup (1340), thus entangling them.

The description and accompanying drawings above provide specific example embodiments and implementations. Drawings containing device structure and composition, for example, are not necessarily drawn to scale unless specifically indicated. Subject matter may, however, be embodied in a variety of different forms and, therefore, covered or claimed subject matter is intended to be construed as not being limited to any example embodiments set forth herein. A reasonably broad scope for claimed or covered subject matter is intended. Among other things, for example, subject matter may be embodied as methods, devices, components, or systems. Accordingly, embodiments may, for example, take the form of hardware, software, firmware or any combination thereof.

Throughout the specification and claims, terms may have nuanced meanings suggested or implied in context beyond an explicitly stated meaning. Likewise, the phrase "in one embodiment/implementation" as used herein does not necessarily refer to the same embodiment and the phrase "in another embodiment/implementation" as used herein does not necessarily refer to a different embodiment. It is intended, for example, that claimed subject matter includes combinations of example embodiments in whole or in part.

Unless defined otherwise, all technical and scientific terms used herein have the same meaning as commonly understood by one of skill in the art to which the invention pertains. Although any methods and materials similar to or equivalent to those described herein can be used in the practice or testing of the present invention, the preferred methods and materials are described herein.

In general, terminology may be understood at least in part from usage in context. For example, terms, such as "and", "or", or "and/or," as used herein may include a variety of meanings that may depend at least in part on the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

The invention claimed is:

1. A method for quantum communication between a first quantum node and a second quantum node having a communication channel length, comprising:

preparing a plurality of quantum repeater nodes forming a series of communication segments spanning from the first quantum node through the plurality of quantum repeater nodes to the second quantum node;

initiating a first connection procedure comprising a first sequence of intermediate connection stages to establish a first direct quantum link between the first quantum node and the second quantum node via the plurality of quantum repeater nodes; and initiating a second connection procedure comprising a second sequence of intermediate connection stages to establish a second direct quantum link between the first quantum node and the second quantum node via the plurality of the quantum repeater nodes during one of the first sequence of intermediate connection states in which at least a predetermined number of consecutive quantum repeater nodes among the plurality of quantum repeater nodes become idle.

2. The method of claim 1, further comprising generating initial separate quantum links each over the series of communication segments and wherein the first sequence of intermediate connection stages comprises performing a sequence of quantum information transfers at the plurality of quantum repeater nodes.

3. The method of claim 2, wherein the first sequence of intermediate connection stages comprises establishing intermediate quantum links between the first quantum node, the plurality of quantum repeater nodes, and the second quantum node involving progressively smaller number of the plurality of quantum repeater nodes until the first direct quantum link between the first quantum node and the second quantum node is established.

4. The method of claim 3, wherein each quantum link comprises a quantum entanglement between quantum bits in separate quantum nodes and the sequence of quantum information transfers comprises a sequence of quantum entanglement swaps at the plurality of quantum repeater nodes.

5. The method of claim 4, wherein each of the plurality of quantum repeater nodes comprises a first quantum bit and a second quantum bit involved in different initial and intermediate quantum links to other quantum repeater nodes, the first quantum node or the second quantum node.

6. The method of claim 5, wherein performing the sequence of quantum information transfers comprises performing the sequence of quantum entanglement swaps between the first quantum bit and the second quantum bit within the plurality of quantum repeater nodes.

7. The method of claim 4, wherein the quantum entanglement between quantum bits in separate quantum nodes is generated by:

generating a pair of entangled single photons by one of the separate quantum nodes; and transmitting one of the pair of entangled single photons to the other of the separate quantum nodes via an optical fiber.

8. The method of claim 1, further comprising initiating the second connection procedure by generating new initial separate quantum links over each communication segment of the consecutive quantum repeater nodes that are idle from the first connection procedure.

9. The method of claim 1, wherein the plurality of quantum repeater nodes comprise at least seven quantum repeater nodes.

10. The method of claim 1, wherein a number of the second sequence of intermediate connection stages is larger than a number of the first sequence of intermediate connection stages.

11. A quantum communication system, comprising:

a first quantum node;

a second quantum node; and a plurality of quantum repeater nodes forming a series of communication segments spanning from the first quantum node through the plurality of quantum repeater nodes to the second quantum node;

wherein the first quantum node, the second quantum node, and the plurality of quantum repeater nodes are configured to perform the method of claim 1.

12. The quantum communication system of claim 11, wherein the first quantum node, the second quantum node, and the plurality of quantum repeater nodes are further configured to:

detect a failure in the first sequence of intermediate connection stages; and determine a progression of the second connection procedure through the second sequence of intermediate connection stages when the failure is detected.

13. The quantum communication system of claim 12, wherein the first quantum node, the second quantum node, and the plurality of quantum repeater nodes are further configured to:

when the progression of the second connection procedure is less than a predetermined progression threshold, terminate the second connection procedure and restarting the first connection procedure; and when the progression of the second connection procedure is further than the predetermine progression threshold, continue with the second connection procedure.

14. A method for quantum communication between a first quantum node and a second quantum node having a communication channel length, comprising:

preparing a plurality of quantum repeater nodes forming a series of communication segments spanning from the first quantum node through the plurality of quantum repeater nodes to the second quantum node;

initiating a first connection procedure comprising a first sequence of intermediate connection stages to establish a first direct quantum link between the first quantum node and the second quantum node via the plurality of quantum repeater nodes;

initiating a second connection procedure comprising a second sequence of intermediate connection stages to establish a second direct quantum link between the first quantum node and the second quantum node via the plurality of the quantum repeater nodes;

detecting a failure in the first sequence of intermediate connection stages;

determining a progression of the second connection procedure through the second sequence of intermediate connection stages when the failure is detected;

when the progression of the second connection procedure is less than a predetermined progression threshold, terminating the second connection procedure and restarting the first connection procedure; and when the progression of the second connection procedure is further than the predetermined progression threshold, continuing with the second connection procedure.

15. A quantum communication system, comprising:

a first quantum node;

a second quantum node; and a plurality of quantum repeater nodes forming a series of communication segments spanning from the first quantum node through the plurality of quantum repeater nodes to the second quantum node;

wherein the first quantum node, the second quantum node, and the plurality of quantum repeater nodes are configured to perform the method of claim 14.

16. A method for quantum communication between a first quantum node and a second quantum node having a communication channel length, comprising:

preparing a plurality of quantum repeater nodes forming a series of communication segments spanning from the first quantum node through the plurality of quantum repeater nodes to the second quantum node;

initiating a first connection procedure comprising a first sequence of intermediate connection stages to establish a first direct quantum link between the first quantum node and the second quantum node via the plurality of quantum repeater nodes; and initiating a second connection procedure comprising a second sequence of intermediate connection stages to establish a second direct quantum link between the first quantum node and the second quantum node via the plurality of the quantum repeater nodes, wherein the first connection procedure and the second connection procedure comprise a same set of operations to entangle neighboring quantum nodes of the first quantum node, the second quantum node, and the plurality of quantum repeater nodes, and a same set of quantum entanglement swap operations in the plurality of quantum repeater nodes.

17. The method of claim 16, further comprising initiating the first connection procedure by entangling consecutive triads of quantum repeaters of the plurality of quantum repeater nodes, and initiating the second connection procedure by entangling consecutive triads of quantum repeaters when they become idle from the first connection procedure and as the first connection procedure is still on going.

18. A method for quantum communication between a first quantum node and a second quantum node having a communication channel length, comprising:

preparing a plurality of quantum repeater nodes forming a series of communication segments spanning from the first quantum node through the plurality of quantum repeater nodes to the second quantum node;

selecting two or more triads of consecutive quantum repeaters separated by at least one other quantum repeater among the plurality of quantum repeater nodes; and initiating a connection procedure comprising a sequence of intermediate connection stages to establish a direct quantum link between the first quantum node and the second quantum node via the plurality of quantum repeater nodes by entangling quantum repeaters within each of the triads of consecutive quantum repeaters.

* * * * *